US005714035A

United States Patent [19]
Stevens

[11] Patent Number: 5,714,035
[45] Date of Patent: Feb. 3, 1998

[54] CORRECTION TAPE DISPENSER

[75] Inventor: Christopher John Stevens, Caversham, England

[73] Assignee: The Gillette Company, Boston, Mass.

[21] Appl. No.: 564,119

[22] PCT Filed: Jun. 8, 1994

[86] PCT No.: PCT/US94/06585

§ 371 Date: Mar. 20, 1996

§ 102(e) Date: Mar. 20, 1996

[87] PCT Pub. No.: WO95/00334

PCT Pub. Date: Jan. 5, 1995

[30] Foreign Application Priority Data

Jun. 17, 1993 [GB] United Kingdom .................. 9312520

[51] Int. Cl.[6] .................................................. B32B 31/00

[52] U.S. Cl. .......................... 156/577; 156/540; 156/579

[58] Field of Search .................................. 156/577, 574, 156/579, 523, 540, 541

[56] References Cited

U.S. PATENT DOCUMENTS

| | | | |
|---|---|---|---|
| Re. 31,726 | 11/1984 | Sato | 156/363 |
| 1,222,592 | 4/1917 | Baldwin . | |
| 2,238,518 | 4/1941 | Dieck | 197/151 |
| 2,400,435 | 5/1946 | Nelson et al. | 216/22 |
| 2,568,904 | 9/1951 | Weber et al. | 216/54 |
| 3,339,797 | 9/1967 | Knutson | 221/73 |
| 3,889,310 | 6/1975 | Barouth et al. | 15/210 |
| 3,906,186 | 9/1975 | Szolis | 219/224 |
| 4,274,906 | 6/1981 | Clar | 156/540 |
| 4,525,237 | 6/1985 | Clar | 156/540 |
| 4,624,733 | 11/1986 | Hamisch, Jr. | 156/541 |
| 4,671,687 | 6/1987 | Tamai | 400/695 |
| 4,750,965 | 6/1988 | Pippel et al. | 156/361 |
| 4,997,512 | 3/1991 | Manusch | 156/486 |
| 5,281,298 | 1/1994 | Poisson et al. | 156/577 X |
| 5,303,759 | 4/1994 | Czech | 156/574 |

FOREIGN PATENT DOCUMENTS

| | | | |
|---|---|---|---|
| 507818 B1 | 9/1993 | European Pat. Off. | B65H 35/07 |
| 672063 | 7/1979 | U.S.S.R. . | |

*Primary Examiner*—James Engel
*Attorney, Agent, or Firm*—Owen J. Meegan; Aubrey C. Brine; Donal B. Tobin

[57] ABSTRACT

A correction tape dispenser body has an applicator tip assembly connected thereto, the assembly including an applicator tip with an edge for pressing a tape against a surface. The tip is connected to a supporting member by a shell bearing to permit relative movement between the tip and the supporting member, about a common axis.

8 Claims, 2 Drawing Sheets

CORRECTION TAPE DISPENSER

This invention relates to a correction tape dispenser for laying down a strip or band of correction composition onto a surface, most usually paper, e.g. to cover markings thereon to facilitate the correction of a mistake.

There are known correction tape dispensers which have supply and take-up spools for the tape mounted within a case to rotate about parallel axes with the supply spool being coupled to drive the take up spool through a slipping clutch arrangement. The case may be adapted to be held directly in the hand of the user, or it may form a cartridge which is inserted into a re-usable outer housing. A length of tape extending between the spools is guided to pass out of the casing and around an applicator head or tip having a relatively sharp edge which is used to press the tape against the surface onto which the correction strip is to be applied. The tape consists of a ribbon, e.g. of plastics or paper, on one side of which is carried a coating of the correction composition, this coating being on the outer side of the ribbon when it passes around the tip. In use, the device is held in the hand and the tip is pressed down onto the paper surface so that its edge presses the tape against the surface across the full width of the tape. The correction composition has an adhesive quality and has greater adhesion to the paper than to its carrier ribbon, so that when the tip is displaced across the paper surface in a direction perpendicular to the tip edge, the tip slides with respect to the ribbon causing tape to be drawn off the supply spool. The consequent rotation of the supply spool rotates the take-up spool so that a substantially constant tension is maintained in the tape and the take-up spool reels in the spent ribbon over which the tip has passed and from which the correction composition coating will have been deposited onto the paper surface. In this way a continuous strip of the correction composition is laid down onto the paper, this strip having a length according to the distance travelled by the dispenser tip.

The known correction tape dispensers operate satisfactorily as far as laying down the correction strip is concerned. However, they do require some practice to ensure that the tip edge is applied correctly against the paper, and the necessary orientation of the tip is maintained throughout the entire stroke of the tip across the paper surface. In particular, the tip edge must at all times lie flat against the paper surface for pressing the tape substantially uniformly against the paper across the full width of the tape. In the prior art correction tape dispensers currently available the applicator tip is substantially rigid with the dispenser body so that the user must hold the dispenser and maintain it at a precise orientation with respect to the paper in the course of laying down a strip of the correction composition. This drawback is exacerbated by the fact that the dispensers are generally arranged so that they must be held in an unnatural attitude relative to the paper due to the configuration and orientation of the body having regard to the direction of the tip edge.

In U.S. Pat. No. 4,671,687 there is proposed a correction tape dispenser with a tape applying tip which is pivotally connected to a body part to allow the tip to pivot about an axis which is transverse to the length of the tip edge. However, the pivot axis is defined at a substantial distance from the edge, where the tip is joined to the body.

The present invention aims to alleviate the drawback explained above and provides a correction tape dispenser having an applicator tip with an edge for pressing the tape against a surface, wherein the tip comprises a part connected to a supporting member by means permitting rocking pivotal movement of the tip about an axis extending transversely of the tip and crossing the tip edge at least in close proximity thereto. With the axis of the tip movement in close proximity to the edge, that is intersecting or very nearly intersecting the edge, an effective self-alignment between the tip edge and the paper can be achieved, thereby making it easier to ensure that the edge is not only initially applied flat against the paper surface, but is also maintained in this flat orientation when stroking the tip along the paper surface as the axis of the tip movement lies substantially in the plane of the paper.

The axis is preferably substantially perpendicular to the direction of the tip edge, i.e. generally aligned with the direction in which the tip is moved in use, and in a specific embodiment the pivot axis intersects the edge at a point substantially midway along it. Conveniently the tip is journalled for pivot movement by a shell bearing, but other forms of pivot are possible.

A full understanding of the invention will be gained from the following detailed description of an exemplary embodiment, reference being made to the accompanying drawings, wherein.

Figure 1:
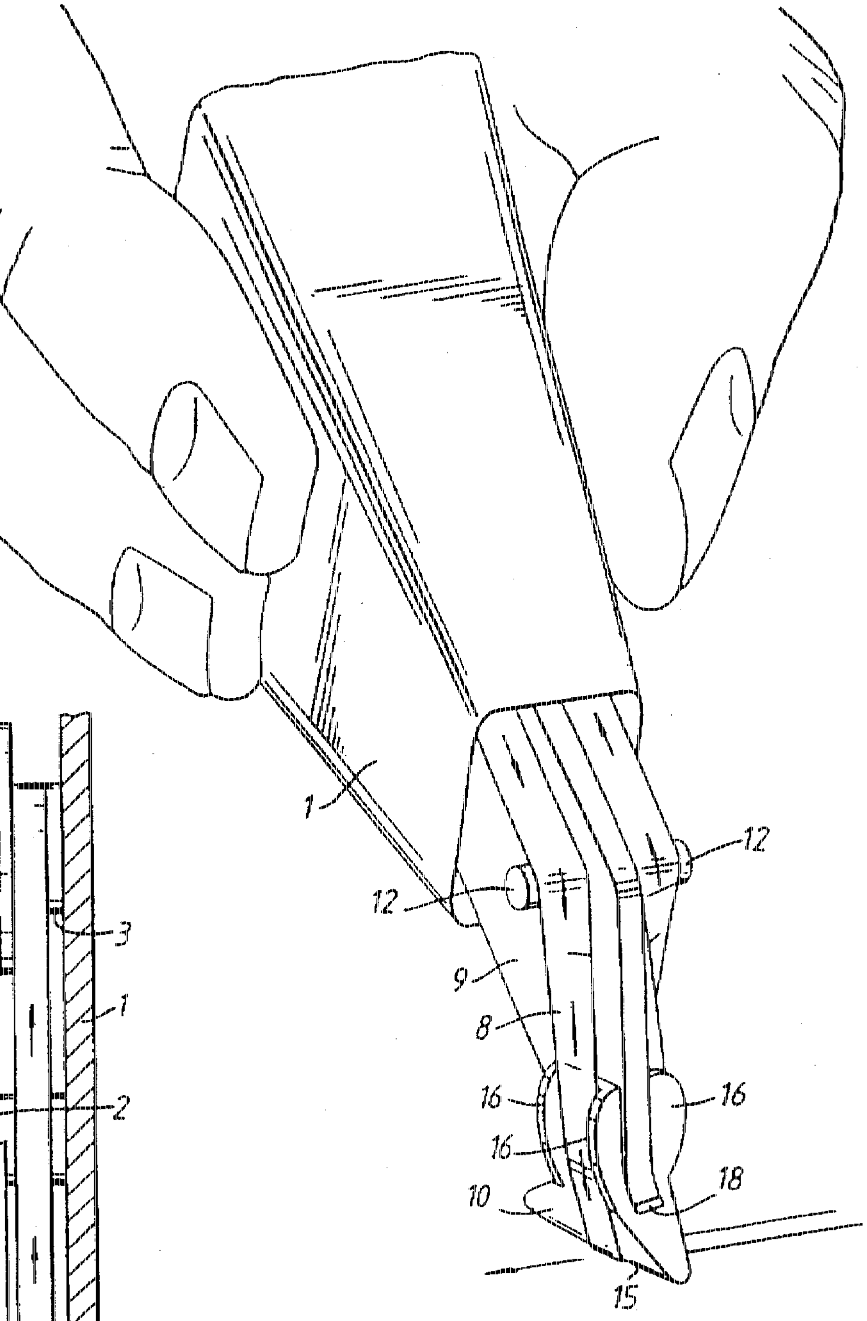
FIG. 1 is a perspective view of a tape dispenser according to the invention in use and with a forward end of the dispenser body shown cut away for ease of illustration.
Figure 2:
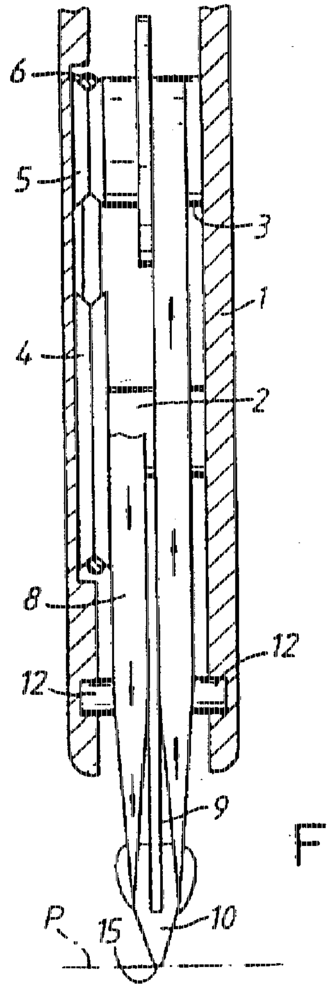
FIG. 2 is a front elevation of the dispenser with the body shown in section.
Figure 3:
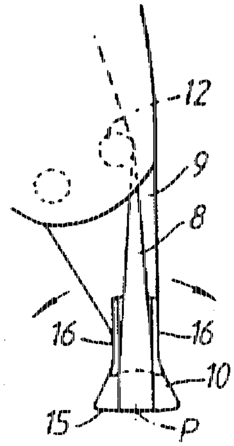
FIG. 3 is a side view of the distal end portion of the dispenser.
Figure 4:
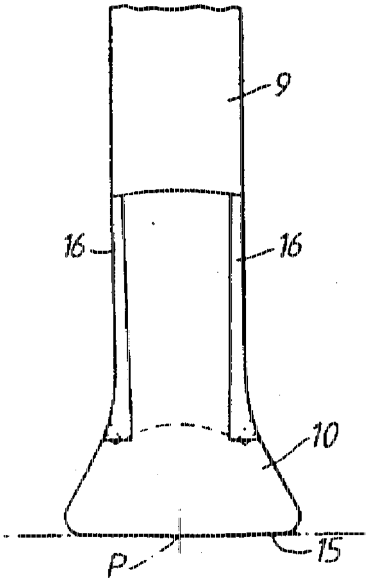
FIG. 4 is an enlarged side elevation of the dispenser tip.

The correction tape dispenser shown in the drawings has a casing or body 1 in which are housed tape supply and take-up spools 2 and 3. The spools are rotatable about their respective parallel axes and as well known in the art are coupled by a slipping drive mechanism, as illustrated in the form of pulleys 4, 5 around which a drive belt 6 is trained, so that rotation of the supply spool 2 in response to tape 8 being drawn therefrom causes the take-up spool 3 to rotate to reel in the tape to prevent the tape becoming slack between the spools. The tape 8 itself can be conventional having a layer of correction composition coating one side of a carrier ribbon.

Mounted in the body to protrude through the forward end thereof is a tip assembly consisting of a tip supporting member 9 and a separate part 10 forming the tip itself. Provided on the member 9 are tape guiding rollers or pegs 12 around which the tape is guided in passing to and from the tip 10, thereby enabling the dispenser body to be held at a more usual writing angle with respect to the paper in use of the dispenser, as explained and described in greater detail in United Kingdom Patent Application No. 9401594.8, (German Application P4404103.9, Japanese Application 15438/94 and U.S. application Ser. No. 08/192,471).

Figure 5A:
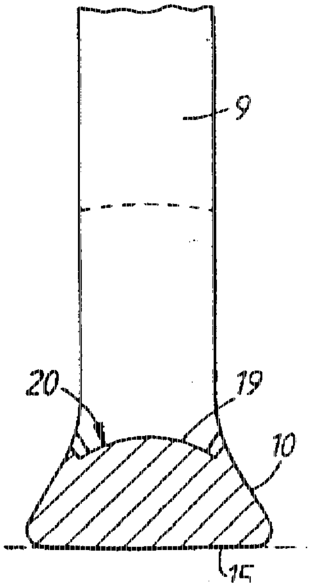
FIGS. 5A, 5B and 5C are cross-sections through the tip showing the normal tip position and the two extreme pivotal positions of the tip, respectively.
Figure 5B:
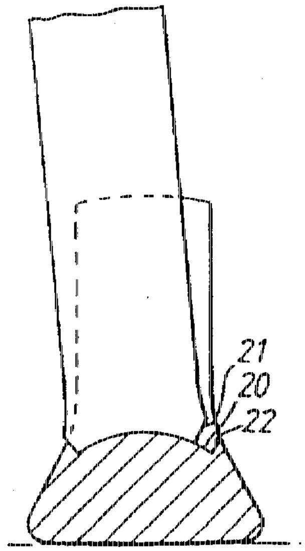
Figure 5C:
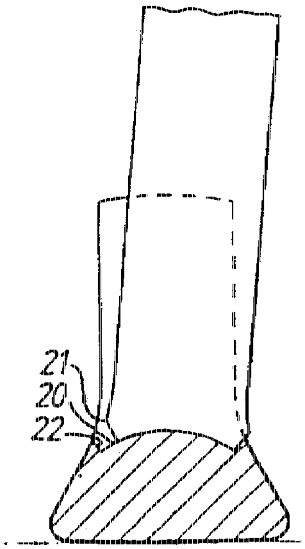

The tip 10 defines the tape application edge 15 around which the tape 8 passes and by means of which the tape is pressed against the paper surface for transferring a strip of correction composition from the carrier ribbon onto the paper. A pair of guide wings 16 is provided on either side of the tip to assist in guiding the tape with respect to the edge 15, and to maintain the tape in correct cooperation with the edge during use. The portion of the tip directed away from the edge is bifurcated to define a slot 18 which is coplanar with the edge 15 and in which is received a flat tongue formed by the end portion of the support member 9. The free end edge of the tongue has a part-cylindrical bearing surface 19 which matches a complementary bearing surface 20 defined by the bottom end wall of the slot 18. The bearing surfaces are centred on an axis P which bisects the line of the edge 15. The bearing surface together define a shell bearing enabling free pivotal movement of the tip 10 relative to the support member, and hence the body of the dispenser, about the axis P. At their ends the bearing surfaces are provided with stop faces 21, 22 which come into abutment to limit the pivotal movement of the tip, as depicted in FIGS. 5B and 5C which show the two extreme pivotal positions. The allowed pivotal movement may be a few degrees e.g. 3°–5° to either side of the normal central position illustrated in FIG. 5A, but could be made larger say up to 10° either side if required. Provided the dispenser body is held approximately in the correct orientation when the tip is applied to the paper surface, the tip edge will align itself automatically to be flat against the surface, with the tape 8 being interposed between the tip edge and the paper. When the tip is displaced across the paper in the direction perpendicular to the edge, the pressure exerted through the tip causes the correction composition to adhere to the paper surface while the tip slides along the tape ribbons causing fresh tape to be drawn from the supply spool 2 and laid down immediately in front of the moving tip. The ribbon over which the tip has passed is drawn back into the body and reeled up on the take-up spools having left the correction composition previously carried thereby on the paper. It is possible for the body of the dispenser to rock slightly during the displacement, without upsetting the flat alignment of the tip edge with the paper, due to the pivotal connection of the tip with the pivot axis lying essentially in the plane of the paper and thereby use of the dispenser is greatly facilitated.

Modifications to the tape dispenser are of course possible without departing from the inventive concept. For example my other ways of pivotally connecting the tip 10 to the supporting member 9 are possible besides that illustrated and described above and alternative pivots will occur to skilled readers. Furthermore, the invention is applicable to all tape dispensers irrespective of the particular configuration and orientation of the dispenser body relative to the tip edge. If desired a light spring could be provided to bias the tip to the central position shown in FIG. 5A although this can be ensured by the tension in the tape.

I claim:

1. A correction tape dispenser having a body member and an applicator tip assembly, said tip assembly comprising:

a supporting member; and an applicator tip, said applicator tip having an edge for pressing a tape against a surface;

said supporting member and said tip being connected one to the other by a pair of mating arcuate bearing surfaces, said arcuate bearing surfaces having a common axis spaced from said mating arcuate bearing surfaces toward said tip to provide relative movement between said supporting member and said tip.

2. A correction tape dispenser according to claim 1 wherein the axis is perpendicular to the edge and intersects said tip adjacent a point substantially midway along the length of said edge.

3. A correction tape dispenser according to claim 1 wherein the said mating arcuate bearing surfaces comprise a shell bearing.

4. A correction tape dispenser according to claim 3, wherein the shell bearing includes stop faces disposed on said supporting member and said tip, which come into abutment to define extreme pivotal positions of the tip.

5. A correction tape dispenser according to claim 1, wherein the tip has a slot coplanar with the edge thereof, and the supporting member includes a tongue portion received in the slot.

6. A correction tape dispenser according to claim 1, wherein the tip has guide means thereon for guiding the tape on either side of said edge.

7. A correction tape dispenser according to claim 1 wherein said common axis intersects said tip adjacent a point substantially midway along the length of said edge.

8. A correction tape dispenser according to claim 1 wherein said common axis is perpendicular to said edge.

* * * * *